United States Patent [19]

Bühler et al.

[11] Patent Number: 5,174,791
[45] Date of Patent: Dec. 29, 1992

[54] PROCESS FOR DYEING AND PRINTING BLEND FABRICS OF POLYESTER AND NATURAL FIBRE MATERIALS WITH DISPERSE DYE AND POLYETHER-POLYESTER TO INHIBIT SOILINGS WITH DISPERSE DYE

[75] Inventors: Ulrich Bühler, Alzenau; Klaus Hofmann, Frankfurt; Hubert Kruse, Kelkheim; Jürgen Kühlwein, Offenbach; Willi Steckelberg, Hofheim, all of Fed. Rep. of Germany

[73] Assignee: Cassella Aktiengesellschaft, Frankfurt am Main, Fed. Rep. of Germany

[21] Appl. No.: 741,473

[22] PCT Filed: Jan. 20, 1990

[86] PCT No.: PCT/EP90/00112
§ 371 Date: Aug. 5, 1991
§ 102(e) Date: Aug. 5, 1991

[87] PCT Pub. No.: WO90/09478
PCT Pub. Date: Aug. 23, 1990

[30] Foreign Application Priority Data

Feb. 8, 1989 [DE] Fed. Rep. of Germany ....... 3903666
Feb. 8, 1989 [DE] Fed. Rep. of Germany ....... 3903667

[51] Int. Cl.⁵ .................. D06P 1/61; D06P 3/82; D06P 3/87; C09B 67/42
[52] U.S. Cl. .................................. 8/532; 8/524; 8/526; 8/527; 8/533; 8/550; 8/582; 8/609
[58] Field of Search .................... 8/532, 533, 582, 609

[56] References Cited

U.S. PATENT DOCUMENTS

| | | | |
|---|---|---|---|
| 3,416,952 | 12/1968 | McIntyre et al. | 428/482 |
| 4,167,395 | 9/1979 | Engelhardt et al. | 8/557 |
| 4,168,145 | 9/1979 | Hintermeier et al. | 8/554 |
| 4,329,391 | 5/1982 | McAlister | 427/393.4 |
| 4,330,588 | 5/1982 | Larson et al. | 427/393.4 |
| 4,386,195 | 5/1983 | Bremer et al. | 528/73 |
| 4,463,165 | 7/1984 | Engelhardt et al. | 252/8.6 |
| 4,736,014 | 4/1988 | Engelhardt et al. | 528/295 |
| 4,868,262 | 9/1989 | Esselborn et al. | 526/273 |

FOREIGN PATENT DOCUMENTS 861671 6/1978 Belgium .

Primary Examiner—A. Lionel Clingman
Attorney, Agent, or Firm—Connolly and Hutz

[57] ABSTRACT

Process for dyeing and printing blended fabrics made from polyester and natural fibre materials, characterized in that the dye baths, padding liquors or printing pastes contain compounds of general formula (I). Dye preparations containing one or more compounds of general formula (I).

9 Claims, No Drawings

PROCESS FOR DYEING AND PRINTING BLEND FABRICS OF POLYESTER AND NATURAL FIBRE MATERIALS WITH DISPERSE DYE AND POLYETHER-POLYESTER TO INHIBIT SOILINS WITH DISPERSE DYE

In the dyeing and printing of polyester/cellulose or polyester/wool blend fabrics, the polyester portion of the blend fabric is in general dyed or printed with disperse dyes and the cellulose or wool portion with reactive, direct, azoic, leuco vat ester, vat, sulphur vat or sulphur dyes.

Problems arise in this connection due to the portion of disperse dye which does not go completely on the polyester portion but remains on the cellulose or wool fibre, where it causes staining, which has an adverse effect on the brilliance of the dyeing and its fastness properties. The dye remaining there has a different, duller shade than that dissolved in the polyester fibre. This is particularly noticeable with light or brilliant dyeings. Owing to its lack of affinity for the cellulose or wool fibre, it also impairs the wash, rub and light fastness properties of the dyeing. This becomes evident for example in subsequent washes, for example in the household wash by the consumer, in that the disperse dye will bleed and stain differently coloured or even white adjacent fabrics. This is a particular problem with deep dyeings, where excess dye is required, with dyeings where the cellulose or wool portion is to remain undyed, and with prints where there are differently coloured printed or else printed and unprinted areas.

A further problem with the dyeing or printing of such blend materials is due to the dispersants used to prepare the disperse dyes or the dye preparations which contain disperse dyes as one ingredient. These, preferably anionic, dispersants are from their preparation light-brown or black products which have affinity for cellulose or wool and, readily go on said fibres, again causing dulling in particular in the case of light or brilliant dyeings.

This problem is in general sought to be overcome by washing the dyeings to remove the staining particles from the fabric. This wash is time- and cost-intensive Since the washing of the dyeing is carried out at temperatures close to the dyeing temperature, disperse dye passing into the wash liquor in the course of the treatment may cause irreversible staining of the polyester portion. If the subsequent clear is carried out reductively or oxidatively or if the dyeing of the cellulose portion is carried out in a reductive medium, the staining disperse dye is destroyed, possibly forming degradation products which in turn cause staining.

To avoid these problems, the patent literature contains proposals for the use of ionic or else nonionic polymeric auxiliaries in the course of dyeing or else in the course of the wash, described for examples in DE-A-3 446 922, DE-C-3 414 306, JP 47-39309, JP 49-117782, JP 49-117783 or JP 51-119886.

It has now been found, surprisingly, that the staining of the cellulose or wool portion by disperse dye preparations in the course of dyeing or printing polyester/cellulose or polyester/wool blend fabrics is prevented or else suppressed to a high degree if, in the dyeing or printing of the blend fabrics, the dyebaths, padding liquors or print pastes contain one or more compounds of the general formula I.

The present invention accordingly provides a process for dyeing and printing blend fabrics of polyester and natural fibre materials, which is characterized in that the dyebaths, padding liquors or print pastes contain one more more compounds of the general formula I

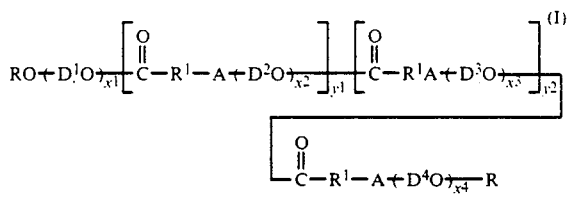

where

R and R' are independently of each other hydrogen, linear or branched alkyl of 1 to 18 carbon atoms which may be substituted by chlorine, bromine or alkoxy of 1 to 4 carbon atoms, cyclopentyl, cyclohexyl, allyl, methallyl, acryloyl, methacryloyl, crotyl, phenyl which is monosubstituted or disubstituted by chlorine, bromine, methyl, alkoxy of 1 to 4 carbon atoms,

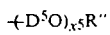

where $X^5$ is from 1 to 10, benzyl or COR'', where R'' may have one of the meanings of R but is independent therefrom, $D^1$ to $D^5$ are each linear ($C_2$-$C_{10}$)- or cyclic ($C_3$-$C_{10}$)- alkylene units which are unsubstituted or substituted by ($C_1$-$C_4$)-alkyl, ($C_1$-$C_4$)-alkoxy or $-(CH_2-OCH_2CH_2)-_pOR$, where p is from 0 to 10, or

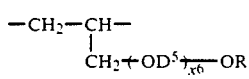

where $D^6$ has independently of $D^1$ to $D^5$ the same meanings as they have and $x^6$ is from 1 to 100, all the groups $D^1$ to $D^5$ within an idealized molecule of the general formula I being freely interchangeable and thus being subject to a random distribution, $X^1$ to $X^5$ are independently of each other from 1 to 100,

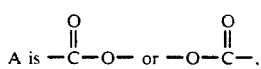

$R^1$ is 1,4-phenylene, 1,2-phenylene, 1,3-phenylene, 1,4-naphtylene [sic], 1,8-naphtylene [sic], 2,2', 2,4'- or 4,4-biphenylene, linear or branched alkylene of 2 to 18 carbon atoms or cyclic alkylene of 4 to 6 carbon atoms, each of which $R^1$ radicals may be substituted by at least one group $SO_3M$ or COOM, where M is hydrogen, a cation from the series of the alkali metals or a cation from the group consisting of ammonia, and primary, secondary, tertiary and quaternary amines, or by

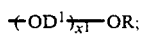

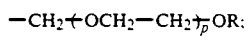

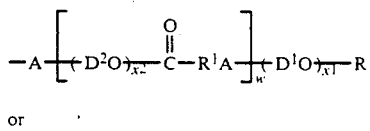

or

-continued

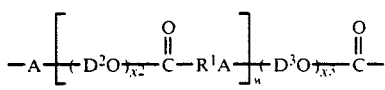

where the last radical is simultaneously substituted by two radicals $R^1$, and w is from 1 to 5, the radicals $R^1$ being subject to a random distribution, and $y^1$ and $y^2$ being independently of each other from 0 to 20 subject to the condition that the sum $y^1+y^2$ is from 0 to 20.

In the general formula I, linear or branched substituted or unsubstituted alkyl R, R' or R" of 1 to 18 carbon atoms can [lacuna], for example, methyl, ethyl, n-propyl, i-propyl, n-butyl, i-butyl, sec-butyl, tert-butyl, n-pentyl, 3-methylbutyl, 3-pentyl, n-hexyl, 2-ethylbutyl, n-heptyl, i-heptyl, 2-octyl, 2-ethylhexyl, i-nonyl, n-decyl, i-decyl, n-dodecyl, n-hexadecyl, n-octadecyl or else mixtures of $(C_4-C_9)$- or $(C_8-C_9)$-alkyl, $(C_6-C_{10})$- or $(C_8-C_{10})$-alkyl, $(C_{10}-C_{12})$-alkyl, $(C_{12}-C_{14})$-alkyl, $(C_{12}-C_{18})$-alkyl, $(C_{13}-C_{18})$-alkyl or $(C_{14}-C_{18})$-alkyl.

Examples of substituted alkyl are 2-chloroethyl, 3-chloropropyl, 1-chloro-2-propyl, 2-bromoethyl and 3-methoxybutyl.

Preferably, R, R' and R" are each hydrogen or alkyl of 1 to 8 carbon atoms, particularly preferably hydrogen or methyl.

$D^1$ to $D^6$ are each preferably ethylene, 1,2-propylene, 1,2-butylene, 1,2-hexamethylene, 3-methoxy,-1,2-propylene, 1,3-propylene, 1,4-butylene, 1,5-pentylene, 1,6-hexamethylene, 1,2-demethylenecyclohexane [sic] or 1,4-demethylenecyclohexane [sic].

Particularly preferably, $D^1$ to $D^6$ are each ethylene, 1,2-propylene or 1,4-butylene.

Preferred $x^1$ and $x^3$ to $x^6$ are each from 1 to 80. Preferred $x^2$ is from 1 to 4.

Linear or branched alkylene $R^1$ of 2 to 18 carbon atoms is for example ethylene, n-propylene, i-propylene, n-butylene, i-butylene, sec-butylene, tert-butylene, n-pentylene, 3-methylbutylene, n-hexylene, 2-ethylbutylene, n-heptylene, i-heptylene, octylene, 2-ethylhexylene, i-nonylene, n-decylene, i-decylene, n-dodecylene, n-hexadecylene, n-octadecylene or else mixtures of $(C_4-C_9)$- or $(C_8-C_9)$-alkylene, $(C_6-C_{10})$- or $(C_8-C_{10})$-alkylene, $(C_{10}-C_{12})$-alkylene, $(C_{12}-C_{14})$-alkylene, $(C_{12}-C_{18})$-alkylene, $(C_{13}-C_{18})$-alkylene or $(C_{14}-C_{18})$-alkylene.

Preferably, $R^1$ is arylene, particularly preferably 1,4-phenylene, 1,3-phenylene or 1,2-phenylene.

Preferred $y^1$ and $y^2$ are each from 1 to 10.

The compounds of the general formula I to be used according to the present invention are preparable by prior art methods as described for example in U.S. Pat. Nos. 3,416,952, 4,463,165, 4,736,014 or 684,511.

The polyester portion of the polyester/cellulose or polyester/wool blend fabrics can be dyed with disperse dyes by the exhaust method under HT conditions or at the boil using a carrier, and the cellulose or wool portion of the blend fabrics with reactive, direct, azoic, vat or leuco vat ester, sulphur vat and sulphur dyes on the one hand or with reactive and direct dyes on the other from an aqueous liquor. However, the dyes may also be applied to the fibre in a continuous process by impregnating the fabric with an aqueous padding liquor which contains these dyes and then fixing these dyes to the fibre by thermosoling, steaming or skying. It is possible here, in principle, to apply the dyes for the polyester portion and the cellulose or wool portion by conjoint or else by separate padding.

A separate padding liquor can be used to apply chemicals, for example alkali and reducing agents, to the fabric in the course of dyeing. The alkali fixes the reactive dye to the cellulose or wool fibre by chemical reaction, and the reducing agent converts the vat or sulphur vat dyes into a form which has affinity for cellulose fibre.

If the fabric is printed, the disperse dye applied to the fabric by means of the print paste is fixed in the polyester fibre by HT steam, high-pressure steam or dry heat.

It is possible in principle to dye the polyester portion and then the cellulose or wool portion. However, it is also possible, conversely, first to dye the cellulose or wool portion and only then the polyester portion.

Furthermore, there are dyeing methods where dyeing takes place in one or two baths or stages. Exhaustive directions concerning the details may be found for example in Melliand Textilberichte 61, 261 (1980); Melliand Textilberichte 64, 290, 357 1983) and Chemifasern-/Textilindustrie 1974, 756.

The amounts of compounds of the general formula I added to the dye padding liquors in the process according to the present invention do of course depend on the staining tendency of the disperse dye preparations used, on the dye content of the dyeing liquor or print paste, on the squeeze-off effect and on the proportion of cellulose or wool in the blend fabric. If disperse dye preparations composed of highly staining dyes and also highly staining dispersions are used, if large amounts of dye are used, if the wet pick-up is high and if the cellulose or wool content of the blend fabric increases for the same amount of disperse dye used, it is necessary to use larger amounts of compounds of the general formula I.

In general, the amounts of compounds of the general formula I in the padding liquor fluctuate between 0.1 and 50 g/l, preferably between 1 and 20 g/l. Particular preference is given to using 1 to 10 g/l.

In the case of dyeings from an aqueous dyeing liquor, the amount does of course also depend on the staining tendency of the disperse dye and of its dispersant, on the concentration of dye in the dyeing liquor, i.e. on the pure dye content of the disperse dye used, on the liquor ratio and also on the cellulose or wool content of the blend fabric.

The amount used here is in general, based on the amount of pure dye used, from 1 to 1,000%, preferably from 10 to 500%. Particular preference is given to using from 10 to 100%.

The amounts used in chemical padding liquors vary within the same limits as for the dye padding liquors. If the disperse dyes used are slightly destroyed by the reducing agent or the alkali of the chemical padding liquor and the degradation products are not strong stainers, the amounts of compounds of the general formula I used may be reduced appropriately.

The process according to the present invention has advantages in particular in the dyeing of polyester/cellulose blend fabrics.

Preferably, the cellulose portion is dyed with sulphur or vat dyes, in particular with the reactive dyes. A particularly preferred process here is that where the polyester portion is dyed by thermosoling and the cellulose portion is dyed with a reactive dye, in particular if the polyester portion is dyed first.

The compounds of the general formula I are in general used in the process according to the present invention in the form of more conveniently handleable aqueous solutions and are thoroughly dispersed in the liquors and baths.

In the process according to the present invention, the compounds of the general formula I are preferably added to the chemical padding liquors and particularly preferably to the dye-containing dyebaths or print pastes. If the latter, their use is the padding liquors is in turn preferred.

Particular preference is given to adding the compounds of the general formula I, however, to the dye preparations from which the dyebaths, padding liquors or print pastes are prepared.

The present invention therefore also provides disperse dye preparations which are characterized in that they contain one or more compounds of the general formula I

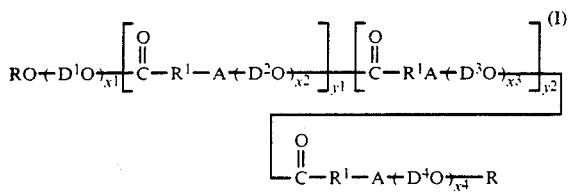

where

R and R' are independently of each other hydrogen, linear or branched alkyl of 1 to 18 carbon atoms which may be substituted by chlorine, bromine or alkoxy of 1 to 4 carbon atoms, cyclopentyl, cyclohexyl, allyl, methallyl, acryloyl, methacryloyl, crotyl, phenyl which is monosubstituted or disubstituted by chlorine, bromine, methyl, alkoxy of 1 to 4 carbon atoms,

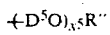

where $X^5$ is from 1 to 10, benzyl or COR", where R" may have one of the meanings of R but is independent therefrom, $D^1$ to $D^5$ are each linear ($C_2$–$C_{10}$)- or cyclic ($C_3$–$C_{10}$)-alkylene units which are unsubstituted or substituted by ($C_1$–$C_4$)-alkyl, ($C_1$–$C_4$)-alkoxy or –(-$CH_2$–$OCH_2CH_2$-)$_p$OR, where p is from 0 to 10, or

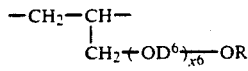

where $D^6$ has independently of $D^1$ to $D^5$ the same meanings as they have and $x^6$ is from 1 to 100, all the groups $D^1$ to $D^5$ within an idealized molecule of the general formula I being freely interchangeable and thus being subject to a random distribution, $X^1$ to $X^5$ are independently of each other from 1 to 100,

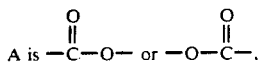

$R^1$ is 1,4-phenylene, 1,2-phenylene, 1,3-phenylene 1,4-naphthalene, 1,8-naphthalene, 2,2'-, 2,4'or 4,4-biphenylene, linear or branched alkylene of 2 to 18 carbon atoms or cyclic alkylene of 4 to 6 carbon atoms, each of which $R^1$ radicals may be substituted by at least one group $SO_3M$ or COOM, where M is hydrogen, a cation from the series of the alkali metals or a cation from the group consisting of ammonia, and primary, secondary, tertiary and quaternary amines, or by

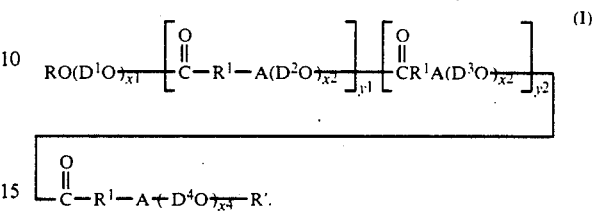

where the last radical is simultaneously substituted by two radicals $R^1$, and w is from 1 to 5, the radicals $R^1$ being subject to a random distribution, and $y^1$ to $y^2$ being independently of each other from 0 to 20 subject to the condition that the sum $y^1+y^2$ is from 0 to 20.

The dye preparations according to the present invention are liquid or pulverulent disperse dye preparations or else dye preparations which contain both the disperse dye and the dye for dyeing the cellulose or wool portion. The latter type of dye preparation comprises for example combinations of disperse, reactive and sulphur or vat dyes. They contain the compounds of the general formula I in amounts of 1 to 50% by weight, preferably 1 to 30% by weight. The dye content is 15 to 40% by weight, preferably 20 to 30% by weight.

Liquid dye preparations are preferred.

The dye preparations according to the present invention are prepared by conjointly milling the dye or dyes in the presence of one or more compounds of the general formula I, one or more dispersants or one or more emulsifiers and in the presence or absence of further auxiliaries in suitable mills.

Suitable mills are for example ball and sand mills.

The milling process is carried out at 0° to 100° C., preferably at 20° to 70° C.

If a pulverulent dispersion is to be prepared, the milling process must be followed by a process of spray-drying. Spray-drying in general limits the addable amount of compounds of the general formula I. Liquid preparations can therefore contain a higher amount than pulverulent ones.

In the case of liquid preparations, the compounds of the general formula I may also be added after the milling process, provided they are thoroughly stirred in. Suitable dispersants are for example anionic or nonionic dispersants, which may also be used together. Anionic dispersants are for example condensation products of aromatic sulphonic acids and formaldehyde, in particular condensation products of alkylnaphthalenesulphonic acids and formaldehyde, condensation products of substituted or unsubstituted phenol with formaldehyde and sodium bisulphite, alkali metal salts of condensation products of substituted or unsubstituted phenol, naphthalene- or naphthol-sulphonic acids, formaldehyde and sodium bisulphite, alkali metal salts of condensation products of substituted or unsubstituted phenolsulphonic acids, formaldehyde and urea, and also alkali metal salts of ligninsulphonic acids. Alkane- or alkylarylene-sulphonates and also alkylaryl polyglycol ether sulphates and in particular neutralized acid esters of an ethoxylated novolak. Nonoinic dispersants or emulsifiers are for example reaction products of alkylene oxides, e.g. ethylene oxide or propylene oxide, with alkylatable compounds, e.g. fatty alcohols, fatty amines, fatty acids, phenols, alkylphenols, arylalkylphenols, arylalkylarylphenols and carboxamides, for example addition products of 5 to 10 ethylene oxide units to $C_8$-$C_{10}$-alkylphenols.

The dispersants mentioned are present in liquid dye preparations in an amount of from 15 to 40% by weight, preferably 20 to 30% by weight, and in pulverulent dye preparations in an amount of from 20 to 45% by weight.

The dye preparations according to the present invention may also contain other auxiliaries, for example those which act as oxidizing agents, e.g. sodium m-nitrobenzenesulphonate, or fungicidal agents, e.g. sodium o-phenolphenolate and sodium pentachlorophenolate. Dye mixtures in powder form in addition contain other auxiliaries for example wetting or dustproofing agents. The dye preparations contain the auxiliaries mentioned in amounts of from 0 to 5% by weight, preferably from 0 to 2% by weight.

The dye preparations according to the invention may also be used for dyeing pure polyester. In this case the polyester substrate to be dyed can be for example piece material (woven or knitted fabric) or yarn material. Preference is given here to preparations which contain compounds of the general formula I where R and R' are not hydrogen.

The inventive concept is illustrated by the following Examples.

EXAMPLE 1

31.3 g of a water-containing filter cake of the dye C.I. Disperse Blue 165 which contains 25 g of pure dye are sand-milled with 22 g ligninsulphonate, 31.7 g of water and 6 g of a compound of the general formula I where R and R' are each hydrogen, $D^1$, $D^2$ and $D^4$ are each ethenyl, $y^1$ is 1, $y^2$ is 0, $x^1$ is 21, $x^4$ and $x^2$ are each 1, and $R^1$ is 4—$C_6H_4$, in the form of 15 g of a 40% strength aqueous solution for 3 hours, so that about 80% of the dye particles are <1 μm in size. On separation from the sand, 30 g of the dye thus obtained are stirred together with 15 g of a commercial antimigration agent and 2 g of monosodium phosphate into a padding liquor in such a way that the final volume of the liquor is 1 liter. This padding liquor is used to impregnate a 65:35 polyester/cotton blend fabric at 25° C., which is then squeezed off to a wet pick-up of about 65%, predried in an infrared dryer for 30 seconds, dried for 60 seconds at 110° C. and exposed to 210° C. for 60 seconds to fix the disperse dye on the polyester fibre. The predyed blend fabric is then subjected to the dyeing conditions of a subsequent reactive dyeing, albeit without dye. To this end, the blend fabric is padded at 25° C. with a chemical bath which contains 240 g/liter of sodium chloride, 15 g/liter of sodium carbonate, 11.3 g/liter of 50% strength sodium hydroxide solution and 4 g/liter of an oxidizing agent based on a benzenesulphonic acid derivative, squeezed off to a wet pick-up of from 90%–100% and steamed at 102° to 105° C. for 45 seconds. The blend fabric is finally rinsed in hot water and dried.

A dyeing carried out for comparison without the addition of a compound of the general formula I has a distinctly duller appearance. If the cotton portion is subsequently dyed to the same shade with a mixture of the commercial forms of C.I. Reactive Blues 19 and 220, the entire dyeing becomes duller if no auxiliary of the general formula I was used.

The effect can be enhanced by dissolving the cotton portion of the blend fabric with sulphuric acid after the dyeing. The remaining polyester portion has been dyed to a distinctly more brilliant shade in the presence of the auxiliary than without it.

If pure cotton, for example cotton poplin, is impregnated with the padding liquor and subjected to a fixation and after-treatment as described above, then the substrate is dyed grey if the dye used does not contain auxiliary yet almost white if the auxiliary was present.

EXAMPLE 1a 30 g of a commercial liquid formulation of C.I. Disperse Blue 165 containing about 25% pure dye and 10 g of a 40% strength aqueous solution of the compound of the general formula I where R and R' are each hydrogen, $D^1$, $D^2$ and $D^4$ are each ethenyl, $y^1$ is 1, $y^2$ is 0, $x^1$ is 21, $x^4$ and $x^2$ are each 1 and $R^1$ is 4—$C_6H_4$ are stirred together with 15 g of a commercial antimigration agent and 2 g of monosodium phosphate into a padding liquor in such a way that the final volume thereof is 1 liter. This padding liquor is then used as described in Example 1. The same excellent results as described in Example 1 are obtained.

If in Example 1 or Example 1a the compound of the general formula I is replaced by the other compounds of the general formula I listed in Table 1, similar results to Example 1 or Example 1a are obtained, unlike in the case of dyeings without auxiliary.

TABLE 1

| Ex. | R | R' | D¹ | D² | D³ | D⁴ | y¹ | y² | x¹ | x⁴ | x² | x³ | R¹ |
|---|---|---|---|---|---|---|---|---|---|---|---|---|---|
| 2 | H | H | —CH₂—CH₂— | —CH₂—CH₂— | — | —CH₂—CH₂— | 1 | 0 | 33 | 1 | 1 | — | TPA |
| 3 | H | H | —CH₂—CH₂— | —CH₂—CH₂— | — | —CH₂—CH₂— | 1 | 0 | 44 | 1 | 1 | — | TPA |
| 4 | H | H | —CH₂—CH₂— | —CH₂—CH₂— | — | —CH₂—CH₂— | 1 | 0 | 67 | 1 | 1 | — | TPA |
| 5 | H | H | —CH₂—CH₂— | —CH₂—CH₂— | — | —CH₂—CH₂— | 1.5 | 0 | 44 | 1 | 1 | — | TPA |
| 6 | H | H | —CH₂—CH₂— | —CH₂—CH₂— | — | —CH₂—CH₂— | 2 | 0 | 67 | 1 | 1 | — | TPA |
| 7 | H | H | —CH₂—CH₂— | $\overset{CH_3}{\underset{-CH_2-CH-}{\mid}}$ | — | $\overset{CH_3}{\underset{-CH_2-CH-}{\mid}}$ | 1 | 0 | 21 | 1 | 1 | — | TPA |
| 8 | H | H | —CH₂—CH₂— | $\overset{CH_3}{\underset{-CH_2-CH-}{\mid}}$ | — | $\overset{CH_3}{\underset{-CH_2-CH-}{\mid}}$ | 1 | 0 | 33 | 1 | 1 | — | TPA |
| 9 | H | H | —CH₂—CH₂— | $\overset{CH_3}{\underset{-CH_2-CH-}{\mid}}$ | — | $\overset{CH_3}{\underset{-CH_2-CH-}{\mid}}$ | 1 | 0 | 44 | 1 | 1 | — | TPA |
| 10 | H | H | —CH₂—CH₂— | $\overset{CH_3}{\underset{-CH_2-CH-}{\mid}}$ | — | $\overset{CH_3}{\underset{-CH_2-CH-}{\mid}}$ | 1 | 0 | 67 | 1 | 1 | — | TPA |
| 11 | H | H | —CH₂—CH₂— | $\overset{CH_3}{\underset{-CH_2-CH-}{\mid}}$ | — | $\overset{CH_3}{\underset{-CH_2-CH-}{\mid}}$ | 2 | 0 | 33 | 1 | 1 | — | TPA |
| 12 | H | H | —CH₂—CH₂— | $\overset{CH_3}{\underset{-CH_2-CH-}{\mid}}$ | — | $\overset{CH_3}{\underset{-CH_2-CH-}{\mid}}$ | 2 | 0 | 44 | 1 | 1 | — | TPA |
| 13 | H | H | —CH₂—CH₂— | —(CH₂)₄— | — | —(CH₂)₄— | 1 | 0 | 44 | 1 | 1 | — | TPA |
| 14 | H | H | —CH₂—CH₂— | —(CH₂)₄— | — | —(CH₂)₄— | 1 | 0 | 67 | 1 | 1 | — | TPA |
| 15 | H | H | —CH₂—CH₂— | —CH₂—CH₂— | — | —CH₂—CH₂— | 1 | 0 | 33 | 1 | 1 | — | 2.55 TPA 0.45 SIA |
| 16 | H | H | —CH₂—CH₂— | —CH₂—CH₂— | — | —CH₂—CH₂— | 2 | 0 | 33 | 1 | 1 | — | |
| 17 | H | H | —CH₂—CH₂— | $\overset{CH_3}{\underset{-CH_2-CH-}{\mid}}$ | — | $\overset{CH_3}{\underset{-CH_2-CH-}{\mid}}$ | 2 | 0 | 33 | 1 | 1 | — | 2.55 IPA 0.45 SIA |
| 18 | CH₃ | H | —CH₂—CH₂— | $\overset{CH_3}{\underset{-CH_2-CH-}{\mid}}$ | — | $\overset{CH_3}{\underset{-CH_2-CH-}{\mid}}$ | 1.25 | 0 | 16 | 1 | 1 | — | TPA |
| 19 | CH₃ | H | —CH₂—CH₂— | $\overset{CH_3}{\underset{-CH_2-CH-}{\mid}}$ | —CH₂—CH₂— | $\overset{CH_3}{\underset{-CH_2-CH-}{\mid}}$ | 3.6 | 0.4 | 30 | 16 | 1 | 31 | TPA |
| 20 | CH₃ | CH₃ | —CH₂—CH₂— | $\overset{CH_3}{\underset{-CH_2-CH-}{\mid}}$ | — | $\overset{CH_3}{\underset{-CH_2-CH-}{\mid}}$ | 1.25 | 0 | 16 | 1 | 1 | — | TPA |

TABLE 1-continued

| Ex. | R | R' | D¹ | D² | D³ | D⁴ | $y^1$ | $y^2$ | $x^1$ | $x^4$ | $x^2$ | $x^3$ | R¹ |
|---|---|---|---|---|---|---|---|---|---|---|---|---|---|
| 21 | CH₃ | CH₃ | —CH₂—CH₂— | CH₃<br>\|<br>—CH₂—CH— | — | —CH₂—CH₂— | 1.25 | 0 | 30 | 30 | 1 | — | TPA |
| 22 | CH₃ | CH₃ | —CH₂—CH₂— | CH₃<br>\|<br>—CH₂—CH— | — | —CH₂—CH₂— | 1.25 | 0 | 44 | 44 | 1 | — | TPA |
| 23 | CH₃ | CH₃ | —CH₂—CH₂— | CH₃<br>\|<br>—CH₂—CH— | — | —CH₂—CH₂— | 4 | 0 | 30 | 30 | 1 | — | TPA |
| 24 | CH₃ | CH₃ | —CH₂—CH₂— | CH₃<br>\|<br>—CH₂—CH— | — | —CH₂—CH₂— | 4 | 0 | 44 | 44 | 1 | — | TPA |
| 25 | CH₃ | CH₃ | —CH₂—CH₂— | CH₃<br>\|<br>—CH₂—CH— | —CH₂—CH₂— | —CH₂—CH₂— | 3.6 | 0.4 | 30 | 30 | 1 | 31 | TPA |
| 26 | CH₃ | CH₃ | —CH₂—CH₂— | CH₃<br>\|<br>—CH₂—CH— | —CH₂—CH₂— | —CH₂—CH₂— | 3.6 | 0.4 | 44 | 44 | 1 | 31 | TPA |
| 27 | CH₃ | CH₃ | —CH₂—CH₂— | —CH₂—CH₂— | —CH₂—CH₂— | —CH₂—CH₂— | 3.6 | 0.4 | 30 | 30 | 1 | 31 | 4 IPA<br>1 SIA |
| 28 | H | H | —CH₂—CH₂— | —CH₂—CH₂— | — | —CH₂—CH₂— | $10 \le z^1$<br>$\le 100$ | 0 | 2 | 2 | 2 | — | 0.825x$z$IPA<br>0.175x$z$SIA |
| 29 | H | H | —CH₂—CH₂— | —CH₂—CH₂— | —CH₂—CH₂— | —CH₂—CH₂— | $9 \le z^1$<br>$\le 90$ | $1 \le z^2$<br>$\le 100$ | 2 | 2 | 2 | 13 | 0.5x$z$IPA<br>0.4x$z$TPA<br>0.1x$z$SIA |

In Table 1 the abbreviations have the following meanings:

TPA: 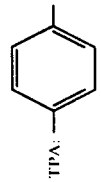

IPA: 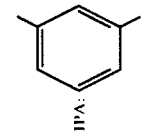

STA: NaO₃S— 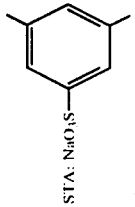

$z^1 + z^2 = z$

EXAMPLE 30

If instead of 25 g (pure dye) of the dye C.I. Disperse Blue 165 16 g (pure dye) of the dye C.I. Disperse Red 184 are finished and dyed as described in Example 1, the result in this case too is a brighter red polyester dyeing, after the cotton has been dissolved away, or, if pure cotton is to be stained, a distinctly lesser stain than without the use of the auxiliary.

EXAMPLE 30a

If instead of 30 g of a liquid commercial form of C.I. Disperse Blue 165 30 g of a liquid commercial form of Disperse Red 184 containing about 16% pure dye are dyed as described in Example 1, the result is a brighter red polyester dyeing, after the cotton has been dissolved away, or, if pure cotton is attempted to be dyed, a distinctly lesser stain than without the use of the auxiliary.

EXAMPLE 31

1 g of the dye C.I. Disperse Blue 165 prepared as described in Example 1 and 0.2 g of the dye C.I. Disperse Red 184 prepared as described in Example 30 are dispersed in 2,000 g of water. The dispersion is admixed with 4 g of ammonium sulphate, 2 g of a commercial dispersant based on a condensation product of sodium naphthalenesulphonate and formaldehyde and 2 g of a condensation product of m-cresol, formaldehyde and sodium sulphite and adjusted with acetic acid to pH 5.5. The dyeing liquor thus obtained is entered with 100 g of a 65:35 polyester/cotton blend fabric for dyeing at 130° C. for 45 minutes. After rinsing, soaping and renewed rinsing, the cotton portion of the blend fabric is dyed with the commercial form of C.I. Reactive Blue 19. This dyeing is again distinctly more brilliant than without the use of the auxiliary of the general formula I.

EXAMPLE 31a 1 g of the abovementioned liquid commercial form of C.I. Disperse Blue 165 and 0.2 g of the abovementioned liquid commercial form of C.I. Disperse Red 184 are dispersed in 2,000 g of water together with 1 g of the compound of the general formula I used in Example 1. The dispersion is admixed with 4 g of ammonium sulphate, 2 g of a commercial dispersant based on a condensation product of sodium naphthalenesulphonate and formaldehyde and 2 g of a condensation product of m-cresol, formaldehyde and sodium sulphite and adjusted with acetic acid to pH 5.5. The dyeing liquor thus obtained is entered with 100 g of a 65:35 polyester/cotton blend fabric for dyeing at 130° C, for 45 minutes. After rinsing, soaping and renewed rinsing, the cotton portion of the blend fabric is dyed with the commercial form of C.I. Reactive Blue 19. The dyeing is again distinctly more brilliant than without the use of the auxiliary of the general formula I.

EXAMPLE 32

400 g of a 10% strength alginate thickening, 5 g of a water softening agent based on polyphosphate, 5 g of an oxidizing agent based on a benzenesulphonic acid derivative, 200 g of urea, 20 g of 10% strength solution of an emulsifier based on a fatty acid glycol ester, 240 g of water, 100 g of white spirit and 30 g of sodium bicarbonate are combined to form a stock thickening. 700 g of this stock thickening are admixed with 15 g of the dye prepared as described in Example 1 and 50 g of the commercial form of C.I. Reactive Blue 53 and 235 g of water by stirring, and this stock colour is roller printed in a pattern onto a polyester/cotton blend fabric. The dyes are then fixed at 175° C. by steaming with superheated steam for 5 minutes, and the fabric is then sprayed with water, soaped and rinsed.

The print is distinctly more brilliant than without the use of the auxiliary of the general formula I.

EXAMPLE 32a 400 g of a 10% strength alginate thickening, 5 g of a water softening agent based on polyphosphate, 5 g of an oxidizing agent based on a benzenesulphonic acid derivative, 200 g of urea, 20 g of a 10% strength solution of an emulsifier based on a fatty acid glycol ester, 240 g of water, 100 g of white spirit and 30 g of sodium bicarbonate are combined to form a stock thickening. 700 g of this stock thickening are admixed with 2.25 g of a 40% strength solution of the compound of the general formula I, 15 g of the abovementioned liquid commercial form of C.I. Disperse Blue 165 plus 50 g of the commercial form of C.I. Reactive Blue 53 and 235 g of water by stirring, and this stock colour is roller printed in a pattern onto a polyester/cotton blend fabric. The dyes are then fixed at 175° C. by steaming with superheated steam for 5 minutes, and the fabric is sprayed with water, soaped and rinsed.

The print is distinctly more brilliant than without the use of the auxiliary of the general formula I.

EXAMPLE 33

88 g of a water-containing filter cake of the dye C.I. Disperse Red 358 which contains 35 g of pure dye are combined with 18 g of a ligninsulphonate and 6 g of the compound of the general formula I used in Example 2 in the form of 5 g of a 40% strength aqueous solution and 21 g of water as described in Example 1 to form a liquid formulation. 1 g of this dye is dispersed in 2,000 g of water. The dispersion is admixed with 2 g of ammonium sulphate and 4 g of a carrier based on methylnaphthalene and adjusted with acetic acid to pH 5. The dyeing liquor thus obtained is entered with 100 g of a 50:50 polyester/wool blend fabric for dyeing at 106° C. for 1 hour. Subsequent rinsing, soaping and renewed rinsing and drying gives a red dyeing which is distinctly brighter than that obtained without the addition of the auxiliary.

EXAMPLE 33a 0.8 g of a commercial powder formulation of C.I. Disperse Red 358 are dispersed in 2,000 g of water together with 0.8 g of a 40% strength aqueous solution of the compound of the general formula I used in Example 1. The dispersion is admixed with 2 g of ammonium sulphate and 4 g of a carrier based on methylnaphthalene and adjusted with acetic acid to pH 5. The dyeing liquor thus obtained is entered with 100 g of a 50:50 polyester/wool blend fabric for dyeing at 106° C. for 1 hour. Subsequent rinsing, soaping and renewed rinsing and drying gives a red dyeing which is distinctly brighter than that obtained without the addition of the auxiliary.

We claim:

1. A method for dyeing and printing of polyester/cellulose or polyester/wool blend fabrics with disperse dyes, which comprises using as dyeing auxiliary a compound of the general formula I

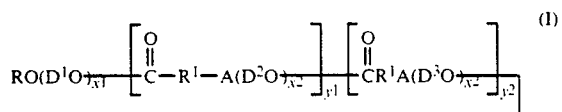 (I)

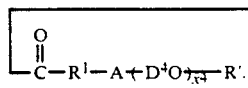

where
R and R' are independently of each other hydrogen; linear or branched alkyl of 1 to 18 carbon atoms which may be substituted by chlorine, bromine or alkoxy of 1 to 4 carbon atoms; cyclopentyl; cyclohexyl; allyl, methallyl; acryloyl; methacryloyl; crotyl; phenyl which is monosubstituted or disubstituted by chlorine, bromine, methyl or alkoxy of 1 to 4 carbon atoms;

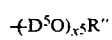

where $x^5$ is from 1 to 10; benzyl or COR'', where R'' has one of the meanings of R; $D^1$ to $D^5$ are linear $(C_2-C_{10})$-alkylene or $(C_3-C_{10})$-cycloalkylene which are unsubstituted or substituted by $(C_1-C_4)$-alkyl, $(C_1-C_4)$alkoxy or —CH$_2$—(OCH$_2$CH$_2$)$_p$—OR, where p is from 0 to 10; or

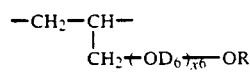

where $D^6$ has independently of $D^1$ to $D^5$ the same meanings as they have and $x^6$ is from 1 to 100, all the groups $D^1$ to $D^5$ within the general formula I being freely interchangeable and thus being subject to a random distribution, $x^1$ to $x^5$ are independently of each other from 1 to 100;
A is

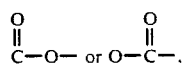

$R^1$ is 1,4-phenylene, 1,2-phenylene, 1,3-phenylene, 1,4-naphthylene, 1,8-naphthylene, 2,2'-, 2,4'- or 4,4-biphenylene, linear or branched alkylene of 2 to 18 carbon atoms or cyclo-alkylene of 4 to 6 carbon atoms, each of which $R^1$ radicals may be substituted by at least one group SO$_3$M or COOM, where M is hydrogen, a cation from the series of the alkali metals or a cation from the group consisting of ammonia, and primary, secondary, tertiary and quaternary amines; or by

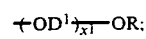

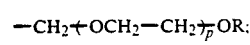

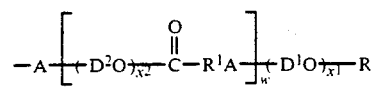

or

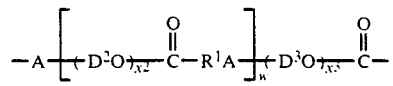

where the last radical simultaneously substitutes two radicals $R^1$; and w is from 1 to 5; the radicals $R^1$ being subject to a random distribution; and $y^1$ and $y^2$ are independently of each other from 0 to 20 subject to the condition that the sum $y^1+y^2$ is from 0 to 20.

2. Method according to claim 1, characterized in that R, R' and R'' are each hydrogen or methyl.

3. Method according to claim 1, characterized in that $D^1$ and $D^6$ are each ethylene, 1,2-propylene or 1,4-butylene.

4. Method according to claim 1, characterized in that $x^1$ and $x^3$ to $x^6$ are each from 1 to 80 and $x^2$ is from 1 to 4.

5. Method according to claim 1, characterized in that $R^1$ is 1,4-phenylene, 1,3-phenylene or 1,2-phenylene.

6. Method according to claim 1, characterized in that $y^1$ and $y^2$ are each from 1 to 10.

7. Disperse dye formulation for preparing dyebaths, padding liquors and print pastes, characterized in that it contains one or more compounds of the general formula I

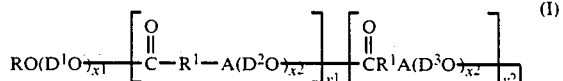 (I)

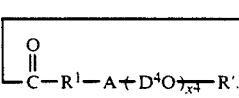

where
R and R' are independently of each other hydrogen; linear or branched alkyl of 1 to 18 carbon atoms which may be substituted by chlorine, bromine or alkoxy of 1 to 4 carbon atoms; cyclophenyl; cyclohexyl; allyl methallyl; acryloyl; methacryloyl; crotyl; phenyl which is monosubstituted or disubstituted by chlorine, bromine, methyl or alkoxy of 1 to 4 carbon atoms;

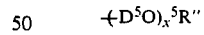

where $x^5$ is from 1 to 10; benzyl or COR'', where R'' has one of the meanings of R; $D^1$ to $D^5$ are linear $(C_2-C_{10})$-alkylene or $(C_3-C_{10})$-cycloalkylene which are unsubstituted or substituted by $(C_1-C_4)$-alkyl, $(C_1-C_4)$alkoxy or —CH$_2$—(OCH$_2$CH$_2$)$_p$—OR, where p is from 0 to 10; or

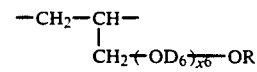

where $D^6$ has independently of $D^1$ to $D^5$ the same meanings as they have and $x^6$ is from 1 to 100, all the groups $D^1$ to $D^5$ within the general formula I being freely interchangeable and thus being subject to a random distribution, $x^1$ to $x^5$ are independently of each other from 1 to 100;

A is

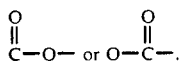

$R^1$ is 1,4-phenylene, 1,2-phenylene, 1,3-phenylene, 1,4-naphthylene, 1,8-naphthylene, 2,2'-, 2,4'- or 4,4-biphenylene, linear or branched alkylene of 2 to 18 carbon atoms or cyclo-alkylene of 4 to 6 carbon atoms, each of which $R^1$ radicals may be substituted by at least one group $SO_3M$ or $COOM$, where M is hydrogen, a cation from the series of the alkali metals or a cation from the group consisting of ammonia, and primary, secondary, tertiary and quaternary amines; or by

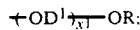

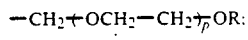

-continued

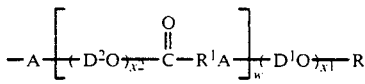

or

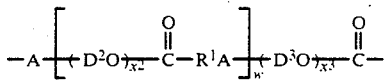

where the last radical simultaneously substitutes two radicals $R^1$; and w is from 1 to 5; the radicals $R^1$ being subject to a random distribution; and $y^1$ and $y^2$ are independently of each other from 0 to 20 subject to the condition that the sum $y^1 + y^2$ is from 0 to 20.

8. Disperse dye formulation according to claim 7, characterized in that the compound of the general formula I is present in amounts of from 1 to 50% by weight.

9. Disperse dye formulation according to claim 7, characterized in that the compound of the general formula I is present in amounts of from 1 to 30% by weight.

* * * * *